United States Patent
Fuhry et al.

(10) Patent No.: US 11,546,341 B2
(45) Date of Patent: Jan. 3, 2023

(54) SECURE GROUP FILE SHARING

(71) Applicant: SAP SE, Walldorf (DE)

(72) Inventors: Benny Fuhry, Karlsruhe (DE); Lina Hirschoff, Wiesloch (DE); Florian Kerschbaum, Waterloo (CA)

(73) Assignee: SAP SE, Walldorf (DE)

( * ) Notice: Subject to any disclaimer, the term of this patent is extended or adjusted under 35 U.S.C. 154(b) by 137 days.

(21) Appl. No.: 16/791,761

(22) Filed: Feb. 14, 2020

(65) Prior Publication Data
US 2021/0266329 A1 Aug. 26, 2021

(51) Int. Cl.
*H04L 9/40* (2022.01)
*H04L 9/32* (2006.01)

(52) U.S. Cl.
CPC .......... *H04L 63/105* (2013.01); *H04L 9/3268* (2013.01); *H04L 63/0428* (2013.01); *H04L 63/083* (2013.01); *H04L 63/102* (2013.01); *H04L 63/104* (2013.01)

(58) Field of Classification Search
CPC . H04L 63/105; H04L 9/3268; H04L 63/0428; H04L 63/083; H04L 63/102; H04L 63/104; H04L 63/0869; H04L 63/0823; H04L 63/101; H04L 9/3226; G06F 2221/2141; G06F 21/604; G06F 21/602; G06F 2221/2145; G06F 2221/2107; G06F 21/445; G06F 21/33; G06F 21/53; G06F 21/6218; H04W 12/069
See application file for complete search history.

(56) References Cited

U.S. PATENT DOCUMENTS

| | | | |
|---|---|---|---|
| 2016/0350534 A1* | 12/2016 | Poornachandran | ... H04L 9/3273 |
| 2018/0145836 A1* | 5/2018 | Saur | .................... G06Q 20/3829 |
| 2018/0191716 A1* | 7/2018 | Chhabra | ................. G06F 21/57 |
| 2018/0336342 A1* | 11/2018 | Narendra Trivedi | ... G06F 21/57 |
| 2019/0065406 A1 | 2/2019 | Steiner et al. | |
| 2020/0134171 A1* | 4/2020 | Li | ........................... G06F 21/53 |
| 2020/0206635 A1* | 7/2020 | Mojarad | ............ H04N 1/32144 |

FOREIGN PATENT DOCUMENTS

EP          1 326 156 A2     7/2003

OTHER PUBLICATIONS

Ittai Anati, "Innovative Technology for CPU Based Attestation and Sealing," 2013, pp. 1-7. (Year: 2013).*
Robert Krahn, ESOS: Policy Enhanced Secure Object Store, Apr. 23-26, 2018, pp. 1-17. (Year: 2018).*
Pierre-Louis Aublin et al. TaLoS: Secure and Transparent TLS Termination inside SGX Enclaves, Jan. 17, 2017, pp. 1-4. (Year: 2017).*

(Continued)

*Primary Examiner* — Luu T Pham
*Assistant Examiner* — Canh Le
(74) *Attorney, Agent, or Firm* — Mintz Levin Cohn Ferris Glovsky and Popeo, P.C.

(57) ABSTRACT

Aspects of the current subject matter are directed to secure group file sharing. An architecture for end-to-end encrypted, group-based file sharing using a trusted execution environment (TEE) is provided to protect confidentiality and integrity of data and management of files, enforce immediate permission and membership revocations, support deduplication, and mitigate rollback attacks.

14 Claims, 4 Drawing Sheets

(56) References Cited

OTHER PUBLICATIONS

Preeti Gulab Sonar et al., "A Novel Approach for Secure Group Sharing in Public Cloud Computing," Oct. 2015, pp. 47-50. (Year: 2015).*

Mazhar Ali et al., "SeDaSC: Secure Data Sharing in Clouds," Jun. 2017, pp. 395-404. (Year: 2017).*

Krahn Robert et al.: "Pesos : Policy Enhanced Secure Object Store", Eurosys '18: Proceedings Of The Thirteenth Eurosys Conference; Apr. 23-26, 2018; Porto, Portugal, Apr. 23, 2018 (Apr. 23, 2018), pp. 1-17, XP055791656, New York, New York, USA DOI: 10.1145/3190508.3190518.

Contiu Stefan et al.: "Anonymous and Confidential File Sharing over Untrusted Clouds", 2019 38th Symposium On Reliable Distributed Systems (SRDS), IEEE, Oct. 1, 2019 (Oct. 1, 2019), pp. 21-2110, XP033751063, DOI: 10.1109/SRDS47363.2019.00013.

European Search Report issued in EP 20203210.8, dated Apr. 13, 2021. 10 pages.

Davfs2—Summary, http://savannah.nongnu.org/projects/davfs2, 2019.

Ahmad, Adil et al., "Obliviate: A Data Oblivious File System for Intel SGX." In Proceedings of the 25th Annual Network and Distributed System Security Symposium (NDSS), 2018.

Anati, Ittai et al., "Innovative Technology for CPU Based Attestation and Sealing." In Workshop on Hardware and Architectural Support for Security and Privacy (HASP), 2013.

Armknecht, Frederik et al., "Side Channels in Deduplication: Tradeoffs Between Leakage and Efficiency." In Proceedings of the 2017 ACM on Asia Conference on Computer and Communications Security (Asia CCS), 2017.

Bethencourt, J., et al., "Ciphertext-Policy Attribute-Based Encryption." In Proceedings of the 2007 IEEE Symposium on Security and Privacy (S&P), 2007.

Boldyreva, Alexandra et al., Identity-based Encryption with Efficient Revocation. In Proceedings of the 15th ACM Conference on Computer and Communications Security (CCS), 2008.

Boneh, Dan et al., Identity-Based Encryption from the Weil Pairing. In Proceedings of the 21st International Conference on Advances in Cryptology (CRYPTO), 2001.

Boneh, Dan et al., "Collusion Resistant Broadcast Encryption with Short Ciphertexts and Private Keys." In Proceedings of the 25th Cryptology Conference (CRYPTO), 2005.

Brasser, Ferdinand et al., Software Grand Exposure: SGX Cache Attacks Are Practical. In Proceedings of the 11th USENIX Conference on Offensive Technologies (WOOT), 2017.

WeTransfer BAT. [n.d.]. WeTransfer. https://wetransfer.com. Accessed: Jun. 25, 2019.

Chen, Sanchuan et al., "Detecting privileged side-channel attacks in shielded execution with Deja Vu." In Proceedings of the 2017 ACM on Asia Conference on Computer and Communications Security (ASICACCS), 2017.

Clarke, Dwaine et al., "Incremental multiset hash functions and their application to memory integrity checking." In 9th International Conference on the Theory and Application of Cryptology and Information Security (ASIACRYPT), 2003.

Contiu, S. et al., "IBBE-SGX: Cryptographic Group Access Control Using Trusted Execution Environments." In Proceedings of the IEEE 48th Annual IEEE/IFIP International Conference on Dependable Systems and Networks (DSN), 2018.

Costan, Victor et al., "Intel SGX Explained. Technical Report." IACR Cryptology ePrint Archive, 2016.

Crane, Stephen et al., "Thwarting Cache Side-Channel Attacks Through Dynamic Software Diversity." In Proceedings of the 22nd Network and Distributed System Security Symposium (NDSS), 2015.

Delerablee, Cecile, "Identity-Based Broadcast Encryption with Constant Size Ciphertexts and Private Keys." In Advances in Cryptology (ASIACRYPT), 2007.

Djoko, Judicael B. et al., "NEXUS: Practical and Secure Access Control on Untrusted Storage Platforms using Client-side SGX." In Proceedings of the 49th IEEE/IFIP International Conference on Dependable Systems and Networks (DSN), 2019.

Douceur, J. R. et al., "Reclaiming space from duplicate files in a serverless distributed file system." In Proceedings 22nd International Conference on Distributed Computing Systems (ICDCS), 2002.

Dropbox. [n.d.]. Dropbox. https://www.dropbox.com. Accessed: Jun. 25, 2019.

Dworkin, Morris, Recommendation for block cipher modes of operation: Galois/Counter Mode (GCM) and GMAC. Technical Report, 2007.

Cx File Explorer, "Cx File Explorer." https://play.google.com/store/apps/details?id=com.cxinventor.file.explorer, 2019.

Fiat, Amos et al., "Broadcast Encryption." In Proceedings of the 14th Cryptology Conference (CRYPTO), 1994.

Fu, Kevin Edward, "Group sharing and random access in cryptographic storage file systems." Master's thesis. Massachusetts Institute of Technology, 1999.

Garrison, W. C. et al., "On the Practicality of Cryptographically Enforcing Dynamic Access Control Policies in the Cloud." In Proceedings of the 2016 Symposium on Security and Privacy (S&P), 2016.

Geron, Erel et al., "CRUST: cryptographic remote untrusted storage without public keys." International Journal of Information Security (2009).

Git scm.com. 2019. Git Objects. https://git-scm.com/book/en/v2/Git-Internals- Git- Objects.

Goh, Eu-Jin et al., "SiRiUS: Securing Remote Untrusted Storage." In Proceedings of the 10th Network and Distributed System Security Symposium (NDSS), 2003.

Google, [n.d.]. Google Drive: Free Cloud Storage for Personal Use. https://www.google.com/intl/en_ALL/drive/. Accessed: Jun. 25, 2019.

Goyal, Vipul et al., "Attribute-based Encryption for Fine-grained Access Control of Encrypted Data." In Proceedings of the 13th ACM Conference on Computer and Communications Security (CCS), 2006.

Green, Matthew et al., "Identity-Based Proxy Re-encryption." In Proceedings of the 5th International Conference on Applied Cryptography and Network Security (ACNS), 2007.

Grolimund, D. et al., "Cryptree: A Folder Tree Structure for Cryptographic File Systems." In Proceedings of the 25th IEEE Symposium on Reliable Distributed Systems (SRDS), 2006.

Gruss, Daniel et al., "Strong and efficient cache side-channel protection using hardware transactional memory." In Proceedings of the 26th USENIX Security Symposium (USENIX Security), 2017.

Harnik, D. et al., "Side Channels in Cloud Services: Deduplication in Cloud Storage." In Proceedings of the 2007 Symposium on Security and Privacy (S&P), 2010.

He, Kai et al., "Anonymous identity-based broadcast encryption with chosen-ciphertext security." In Proceedings of the 11th ACM on Asia Conference on Computerand Communications Security (ASICACCS), 2016.

Hoekstra, Matthew et al., "Using Innovative Instructions to Create Trustworthy Software Solutions." In Workshop on Hardware and Architectural Support for Security and Privacy (HASP), 2013.

Apple Inc., ""Pages for iPad: Use a WebDAV server to store Pages documents."" https://support.apple.com/kb/PH23552?viewlocale=en_.

Intel, "Intel Software Guard Extensions Programming Reference." https://software.intel.com/sites/default/files/managed/48/88/329298-002.pff, 2014.

Intel, "Intel Software Guard Extensions SSL." https://github.com/intel/intel-sgx-ssl, 2019.

Intel Corporation, "Intel® Software Guard Extensions (Intel® SGX)." https://software.intel.com/sites/default/files/332680-002.pdf, 2015.

Kallahalla, Mahesh et al., "Plutus: Scalable Secure File Sharing on Untrusted Storage." In Proceedings of the 2nd USENIX conference on file and storage technologies (FAST), 2003.

Keelveedhi, Sriram et al., Dup-LESS: server-aided encryption for deduplicated storage. In Proceedings of the 22nd USENIX Security Symposium (USENIX Security), 2013.

Krebs, Brian, "Breach at Cloud Solution Provider PCM Inc." https://krebsonsecurity.com/2019/06/breach-at-cloud-solutionprovider-pcm-inc/, 2019.

(56) References Cited

OTHER PUBLICATIONS

Li, J. et al., "Rekeying for Encrypted Deduplication Storage." In Proceedings of the 46th IEEE/IFTP International Conference on Dependable Systems and Networks (DSN), 2016.
Matetic, Sinisa et al., "ROTE: Rollback Protection for Trusted Execution." In Proceedings of the 26th USENIX Security Symposium (USENIX Security), 2017.
McKeen, Frank et al., "Innovative Instructions and Software Model for Isolated Execution." In Workshop on Hardware and Architectural Support for Security and Privacy (HASP), 2013.
MEGA. [n.d.]. ""MEGA Security White Paper."" https://mega.nz/.
Merkle, Ralph C., "A digital signature based on a conventional encryption function." In Conference on the theory and application of cryptographic techniques. Springer, 1987.
Muthitacharoen, Athicha et al., "A Low-bandwidth Network File System." In Proceedings of the 18th ACM Symposium on Operating Systems Principles (SOSP), 2001.
Naor, Dalit et al., "Revocation and Tracing Schemes for Stateless Receivers." In Proceedings of the 21st International Conference on Advances in Cryptology (CRYPTO), 2001.
Ng, Alfred et al., "Capital One data breach involves 100 million credit card applications." https://www.cnet.com/news/capitalone-data-breach-involves-100-million-credit-card-applications/, 2019.
Popa, Raluca Ada et al., "Enabling Security in Cloud Storage SLAs with Cloud-Proof." In Proceedings of the 11th USENIX Annual Technical Conference (ATC), 2011.
Inc. in collaboration with DataBreaches.net Protenus, Protenus 2019 Breach Barometer, https://www.protenus.com/2019-breach-barometer, 2019.
Quinlan, Sean et al., "Venti: A New Approach to Archival Storage." In Proceedings of the 1st USENIX conference on file and storage technologies (FAST), 2002.
Ritzdorf, Hubert et al., "On Information Leakage in Deduplicated Storage Systems." In Proceedings of the 2016 ACM on Cloud Computing Security Workshop (CCSW), 2016.
"Rivest, Ronald L.," All-or-nothing encryption and the package.
Sahai, Amit et al., "Fuzzy Identity-Based Encryption." In Proceedings of the 24th International Conference on Advances in Cryptology (EUROCRYPT), 2005.
Sakai, Ryuichi et al., "Identity-Based Broadcast Encryption." 2007.
Sasy, Sajin et al., "Zero-Trace: Oblivious Memory Primitives from Intel SGX." In Proceedings of the 25th Network and Distributed System Security Symposium (NDSS), 2018.
Shamir, et al., "Identity-Based Cryptosystems and Signature Schemes." In Proceedings of the 5th International Conference on Advances in Cryptology (CRYPTO), 1985.
Shinde, Shweta et al., "Preventing page faults from telling your secrets." In Proceedings of the 11th ACM on Asia Conference on Computer and Communications Security (ASICACCS), 2016.
Shinde, Shweta et al., "BesFS: Mechanized Proof of an Iago-Safe Filesystem for Enclaves." Technical Report. arXiv.org, 2018.
Inc. South River Technologies, "WebDrive is the WebDAV Client that Works." https://webdrive.com/webdav-with-webdrive/, 2019.
Sync.com. [n.d.], "Privacy White Paper." https://www.sync.com/pdf/sync-privacy.pdf. Accessed: Jun. 25, 2019.
Tanenbaum, Andrew S. et al., "Modern operating systems." Pearson, 2015.
The OpenSSL Project, "OpenSSL." https://github.com/openssl/openssl, 2019.
Waters, Brent, "Efficient Identity-Based Encryption Without Random Oracles." In Proceedings of the 24th International Conference on Advances in Cryptology (EUROCRYPT), 2005.
Weichbrodt, Nico et al., "AsyncShock: Exploiting synchronisation bugs in Intel SGX enclaves." In European Symposium on Research in Computer Security (ESORICS), 2016.
Whitehead, E James et al., WebDAV: IEFT standard for collaborative authoring on the Web, 1998.
Xu, Yuanzhong et al., "Controlledchannel attacks: Deterministic side channels for untrusted operating systems." In Proceedings of the 2015 IEEE Symposium on Security and SIGMOD '20, Jun. 14-19, 2020, Portland, OR, SIGMOD '20, Jun. 14-19, 2020, Portland, OR.

* cited by examiner

SECURE GROUP FILE SHARING

FIELD

The present disclosure generally relates to secure group file sharing.

BACKGROUND

File sharing applications using cloud storage are increasingly popular for personal and business use. For example, employees of a company want to share files with colleagues. Due to data protection concerns, end-to-end encryption is often a desired feature of file sharing applications. A convenient remote repository is a cloud-based file sharing service as it can reduce cost, increase availability, and enable seamless multi-device access to files. However, data at cloud services may be accessed by unauthorized parties or exposed by internal attackers.

SUMMARY

Methods, systems, and articles of manufacture, including computer program products, are provided for secure group file sharing.

According to an aspect, a system includes at least one data processor and at least one memory storing instructions which, when executed by the at least one data processor, result in operations including: establishing, by an enclave executed by a trusted execution environment that runs at an untrusted provider, a trusted relationship with a user accessing a user application, where the establishment is at least partially based on a trust measurement communicated between the enclave and a certificate authority component associated with the user; associating, by the enclave, one or more access control permissions to a file linked from the user application to a remote file system at the untrusted provider, where the one or more access control permissions define one or more parameters of access related to the file and defined by the user for individual users and/or groups of users, and where the file is linked to the remote file system over a secure interface between the user application and the enclave; and providing, by the enclave, access to the file, where the providing is in response to a verification that a request for the file satisfies the one or more access control permissions, and where the providing includes the enclave receiving the file in an encrypted form from the remote file system, decrypting the encrypted file, and sending the file over a protected channel to provide access to the file.

In an inter-related aspect, a method includes: establishing, by an enclave executed by a trusted execution environment that runs at an untrusted provider, a trusted relationship with a user accessing a user application, where the establishment is at least partially based on a trust measurement communicated between the enclave and a certificate authority component associated with the user; associating, by the enclave, one or more access control permissions to a file linked from the user application to a remote file system at the untrusted provider, where the one or more access control permissions define one or more parameters of access related to the file and defined by the user for individual users and/or groups of users, and where the file is linked to the remote file system over a secure interface between the user application and the enclave; and providing, by the enclave, access to the file, where the providing is in response to a verification that a request for the file satisfies the one or more access control permissions, and where the providing includes the enclave receiving the file in an encrypted form from the remote file system, decrypting the encrypted file, and sending the file over a protected channel to provide access to the file.

In some variations, one or more of the features disclosed herein including the following features can optionally be included in any feasible combination. Establishing the trusted relationship may include: providing, by the enclave and to the certificate authority component, a server token request including a public key; receiving, by the enclave and from the certificate authority component, a server token signed with a certificate authority public key; and verifying, by the enclave, the received server token, where the verification is based upon the certificate authority public key. The certificate authority public key may be hard-coded into the enclave, and the server token may be persisted to memory of the enclave upon verification of the received server token. Establishing the trusted relationship may include: receiving, by the enclave and from the user application, an authentication token; and verifying, by the enclave, the authentication token based upon the certificate authority public key. The one or more parameters of access related to the file may include a level of permission for the individual users and/or the groups of users. An external, untrusted interface may establishes a secure connection including the secure interface between the user application and the enclave. The file may be encrypted with a file key, the file key unique to the file and derived from a root key generated by the enclave. The encryption of the file with the file key may occur within the enclave. The encrypted file may be decrypted in the enclave and sent to the user application over a channel including a secure interface. Providing, by the enclave, access to the file may be further in response to establishment of a second trusted relationship with a second user having individual access rights or being part of a group with access rights.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
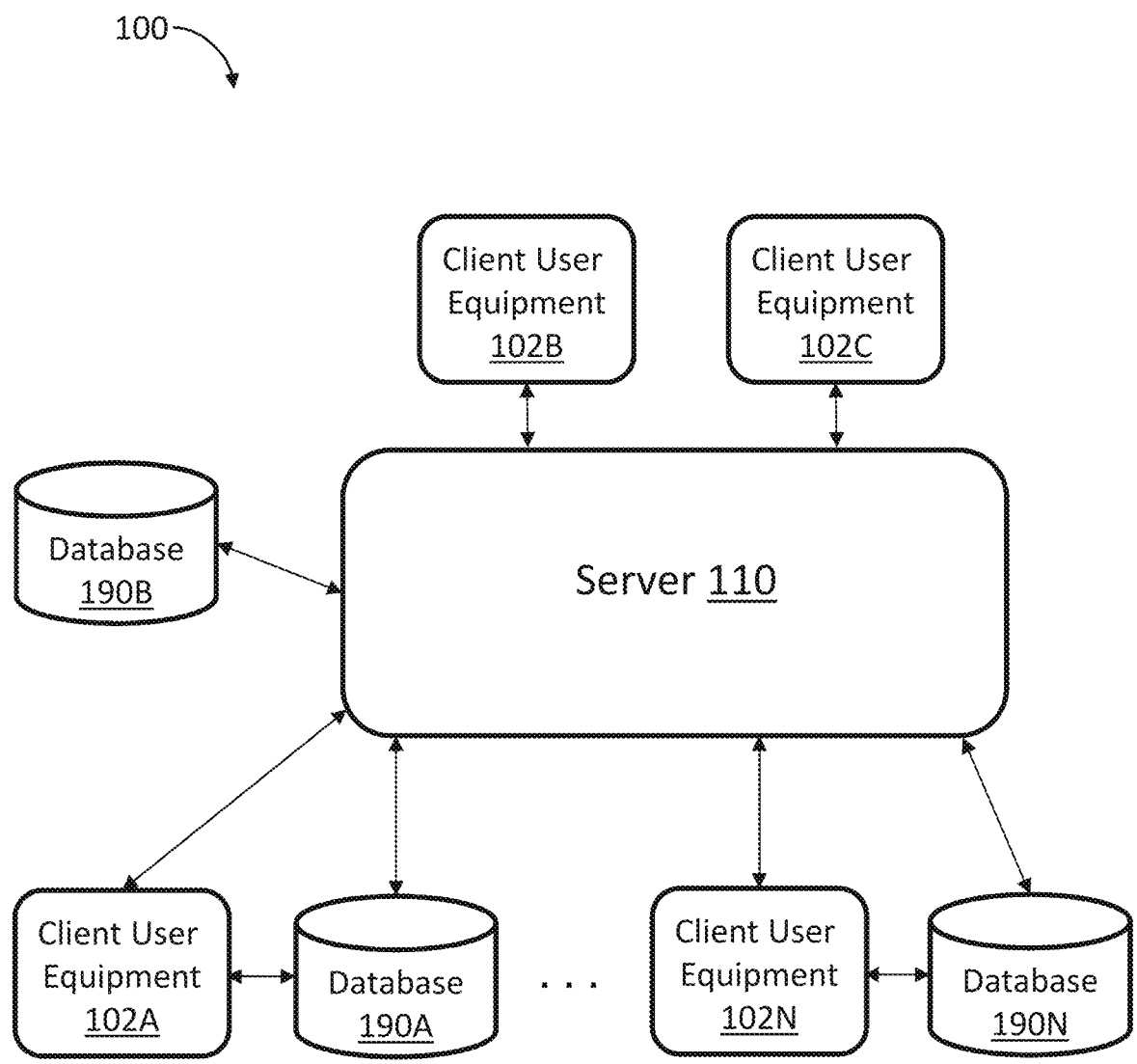
FIG. 1 is a block diagram illustrating a system architecture in which implementations of the current subject matter may be employed.

Aspects of the current subject matter are directed to secure group file sharing. More particularly, an architecture for end-to-end encrypted, group-based file sharing using a trusted execution environment (TEE) is provided to protect confidentiality and integrity of data and management of files, enforce immediate permission and membership revocations, support deduplication, and mitigate rollback attacks.

An architecture consistent with implementations of the current subject matter provides for authentication, authorization, and file system management, and features an optimized transport layer security (TLS) layer that enables high throughput and low latency. The encryption overhead of the disclosed implementation is extremely small in computation and storage resources, and enables efficient mitigation of common pitfalls in deploying code to trusted execution environments.

The architecture consistent with implementations of the current subject matter uses a trusted execution environment for secure file sharing. Trusted execution environments provide an isolated, trusted environment (also referred to as an enclave) for application code and data in an untrusted environment. In some instances, the trusted execution environment may be an Intel® Software Guard Extensions (SGX) environment, although implementations of the current subject matter are not so limited and other trusted execution environments that provide the required capabilities may be used.

The architecture consistent with implementations of the current subject matter may support group file sharing in large and dynamic groups. The architecture may be trusted execution environment-based without using a cryptographic access control scheme. Via tokens, users authenticate themselves to the enclave (an isolated, trusted environment for application code and data in an untrusted environment) and establish a secure channel with it, which is used for all subsequent communication. On every user access, the enclave checks encrypted access control policies to enforce read and/or write access on files. Immediate permission or membership revocations may only require an inexpensive modification of an encrypted file. Users may upload (e.g., arbitrarily large) files through the secure channel directly into the enclave. If the upload is granted, the enclave encrypts the files with, for example, a random key using probabilistic authenticated encryption or other encryption schemes. The enclave then stores the files in the untrusted environment. On each granted file request, the file is decrypted inside the enclave and sent to the user over the secure channel. The architecture consistent with implementations of the current subject matter separates authentication and authorization using identity information in the tokens. As long as the identity information is preserved, no further change is necessary if a user's token is replaced or if a user has different tokens for multiple devices. According to aspects of the current subject matter, the disclosed architecture does not require complex cryptographic operations on permission or membership changes.

The architecture according to aspects of the current subject matter protects files from hackers attempting to access data as only permitted users are able to access the files. Additionally, the architecture provides for sharing data with groups of users.

FIG. 1 depicts an example of a system 100 in which implementations of the current subject matter may be employed.

The system 100 may include one or more client user equipment 102A-N, such as a computer, a smart phone, a tablet, an Internet of Things (IoT) device, and/or other devices (e.g., processor and memory-based devices). The user equipment 102A-N may include a user interface, such as a browser or other application to enable access to one or more applications, database layer(s), and/or databases 190A-N.

The server 110 may receive queries, requests, and/or commands from the user equipment 102A-N. The communication between the user equipment 102A-N and the server 110 may be via a connection, such as a wired and/or wireless connection (e.g., the Internet, cellular links, WiFi links, and/or the like). The server 110 may access data from the databases 190A-N, which may be associated with one or more of the user equipment 102A-N.

The server 110 is one example of a cloud provider that may be utilized for the architecture consistent with implementations of the current subject matter.

The trusted execution environment, according to aspects of the current subject matter, may guarantee confidentiality and integrity protection to code and data in it, even in an untrusted environment, such as the server 110. Consistent with implementations of the current subject matter, the trusted execution environment may dedicate at least a portion of the system's main memory (e.g., RAM) for processor reserved memory (PRM). All code and data in the processor reserved memory may be encrypted while residing outside of the central processing unit, and decrypted and integrity checked when the data is loaded into the central processing unit. All other software on the system, including privileged software such as the operating system, hypervisor, and firmware, cannot access the processor reserved memory. The operating system may swap out enclave pages, and the trusted execution environment ensures integrity, confidentiality, and freshness of swapped-out pages. According to aspects of the current subject matter, programs using the trusted execution environment may also include an untrusted part, and the host process may invoke the enclave only through a well-defined interface.

The trusted execution environment may have a remote attestation feature, allowing for verification of code integrity and authenticity on a remote system. This is done by hashing (also referred to as measuring) the initial code and data loaded into the trusted execution environment. A signed version of the measurement may be provided to an external party to prove the correct creation of a trusted execution environment. Furthermore, the remote attestation feature allows to establish a secure channel between an external party and a trusted execution environment. This secure channel may be used to deploy sensitive data, e.g., cryptographic keys, directly into the trusted execution environment.

The trusted execution environment consistent with implementations of the current subject matter is stateless (e.g., all of its contents are lost when the trusted execution environment is destroyed). To preserve data for multiple enclave runs, the trusted execution environment offers data sealing. This process uses a sealing key to encrypt and integrity-protect data. Afterwards, the data may be stored outside of the trusted execution environment in untrusted memory, and only the trusted execution environment with the same sealing key may unseal the data.

Consistent with implementations of the current subject matter, a protected file system library may be part of the trusted execution environment and may provide a subset of a regular C file application program interface (API), (e.g., file creation, file writing, and file reading). On write, data may be separated into chunks, the data's integrity ensured with, for example, a Merkle hash tree variant, and each chunk encrypted before it is stored in untrusted memory. When file chunks are loaded back into the trusted execution environment, the confidentiality and integrity is verified. The encryption key may be provided manually, or it may be derived automatically from the sealing key. At any point, only one file handle may be open for writing, but many handles for reading.

A primary performance overhead of trusted execution environment applications may be switches into and out of an enclave, because state has to be saved and restored. Consistent with implementations of the current subject matter, switchless calls may reduce this overhead. Calls into the enclave are replaced by writing tasks into an untrusted buffer, and enclave worker threads asynchronously perform the task. Calls out of the enclave are written into a separate untrusted buffer, and untrusted threads perform the tasks.

Probabilistic authenticated encryption (PAE), according to aspects of the current subject matter, may provide confidentiality, integrity, and authenticity of encrypted data. For example, PAE_Enc takes a secret key SK, a random initialization vector IV and a plaintext value u as input and returns a ciphertext c. PAE_Dec takes SK and c as input and returns υ if υ was encrypted with PAE_Enc under the initialization vector IV and the secret key SK.

A generic file system model that fits to various operating systems may be used according to implementations of the current subject matter. A file system (FS) may be composed of files ($F_C$) and directories ($F_D$). Files may be denoted as content files, and directories as directory files as both are stored in files. Each $f_c \in F_C$ contains a linear array of bytes that may be read and written. Each $f_D \in F_D$ is a collection of files and/or further directories, and it stores a list of all its children. The directories form a tree with a root directory file ($f_{Dr}$) at the root of the tree. The parent directory of each f∈FS is specified by its parent in the tree. Each $f_D$ has a directory name. The directory name of $f_{Dr}$ is defined as "|", and all other directory names are flexible excluding the character "|". Each $f_D$ has a path that is specified by its location in the directory tree hierarchy: the path is the concatenation of all directory names in the tree from $f_{Dr}$ to $f_D$ delimited and concluded by "|". Each $f_c$ has a filename, and $f_c$'s path is the concatenation of the path of its parent directory and its filename.

According to aspects of the current subject matter, a file system owner (FSO) (e.g., a company) may have many users (U) (e.g., employees). Those users want to share files via a file sharing system hosted at a cloud provider. The FSO has an authentication service, which provides an authentication token with identity information to all users. A certificate authority (CA) may be used as authentication service, and certificates as authentication tokens. To use the system consistent with implementations of the current subject matter, users only have to store the authentication token. They use this token for authentication while establishing a secure channel with an enclave running at the cloud provider (e.g., the server 110). Without any special hardware, users use the established secure channel for the following requests: create, update, move, download, remove files; create, list, move, remove directories; set file/directory permissions for an individual user or a group; create groups; and change group memberships. All requests do not require interaction with other users and authorization is done with the identity information contained in the authentication token, which leads to a separation of authentication and authorization. As a result, as long as the identity information is preserved, no further change is necessary if a user's authentication token is replaced or if a user has different authentication tokens for multiple devices.

Table 1 presents an overview of an access control model consistent with implementations of the current subject matter.

TABLE 1

| Element | Description |
| --- | --- |
| U | Set of individual users u |
| G | Set of individual groups g; each user u has a default $g_u$ |
| P | Set of individual permissions p ∈ {$p_r$, $p_w$, $p_{deny}$} |
| $F_C$ | Set of stored individual content files $f_C$ |
| $F_D$ | Set of stored individual directory files $f_D$ |
| FS | File system FS = $F_C \cup F_D$ |
| $r_G \subset U \times G$ | (u, g) ∈ $r_G$: user u is member of group g |
| $r_P \subset P \times G \times FS$ | (p, g, f) ∈ $r_P$: group g has permission p for file f |
| $r_I \subset FS$ | f ∈ $r_I$: file f inherits permissions from its parent |
| $r_{FO} \subset G \times FS$ | (g, f) ∈ $r_{FO}$: group g owns file f |
| $r_{GO} \subset G \times G$ | ($g_1$, $g_2$) ∈ $r_{GO}$: group $g_1$ owns group $g_2$ |

A user u∈U is assigned to one group g∈G or multiple groups. Additionally, each user u is part of its default group $g_u$, (e.g., a group that only contains u). Each g has a group owner (GO), which initially is the user u adding the first member to g. GOs can change group memberships ($r_G$) and extend the group ownership ($r_{GO}$) to other groups. Every f∈FS has at least one file owner (FO), which initially is the user uploading a file or creating a directory. For any file f and group g, the FO can set read ($p_r$) and/or write ($p_w$) permissions. Alternatively, access can be denied ($P_{deny}$). As a result, a user's permissions depend on the permissions of all groups of which he is a member. The main benefit of group-based permission definitions ($r_P$) is that a membership update is sufficient to provide or revoke a user's access to many files instead of changing the permissions of all affected files individually. FOs can define that a file f∈FS should inherit permissions from its parent ($r_I$). This enables, for example, central permissions management of multiple files: create a directory, set the desired permissions for the directory, add files to the directory, and define that the files should inherit permissions. Finally, FOs can extend the group ownership ($r_{GO}$) to other groups.

The architecture consistent with implementations of the current subject matter further provides: immediate revocation (e.g., file permission or membership updates, such as revocations, are enforced instantly without time-consuming re-encryptions of files f belong to the file system FS); a constant number of ciphertexts for each file f belonging to the file system FS, independent of permissions and group memberships; confidentiality and integrity protection of all content files, the file system structure, permissions, existing groups, and group memberships; storage space reduction by deduplicating files and using the same encrypted files for different groups; and rollback protection for individual files and the whole file system.

Table 2 presents an overview of functional, performance, and security objectives of the architecture consistent with implementations of the current subject matter.

TABLE 2

| obj. | Description |
| --- | --- |
| F1 | File sharing with individual users/groups |
| F2 | Dynamic permissions/group memberships |
| F3 | Users set permissions |
| F4 | Separate read and write permissions |
| F5 | Users (and administrators) do not need special hardware |
| F6 | Non-interactive permission/membership updates |
| F7 | Multiple file owners/group owners |
| F8 | Separation of authentication and authorization |
| F9 | Deduplication of encrypted files |
| F10 | Permissions can be inherited from parent directory |
| P1 | Constant client storage |
| P2 | Group-based permission definition |
| P3 | File permissions/group membership revocations do not require re-encryption of content or directory files |
| P4 | Constant number of ciphertexts for content and directory files |
| P5 | Different groups can access the same encrypted file |
| S1 | Protect confidentiality of content files/file system structure/permissions/existing groups/group memberships |
| S2 | Protect integrity of content files/file system structure/permissions/existing groups/group memberships |
| S3 | End-to-end protection of user files |
| S4 | Immediate revocation |
| S5 | Protection against rollback of individual files/whole file system |

Figure 2:
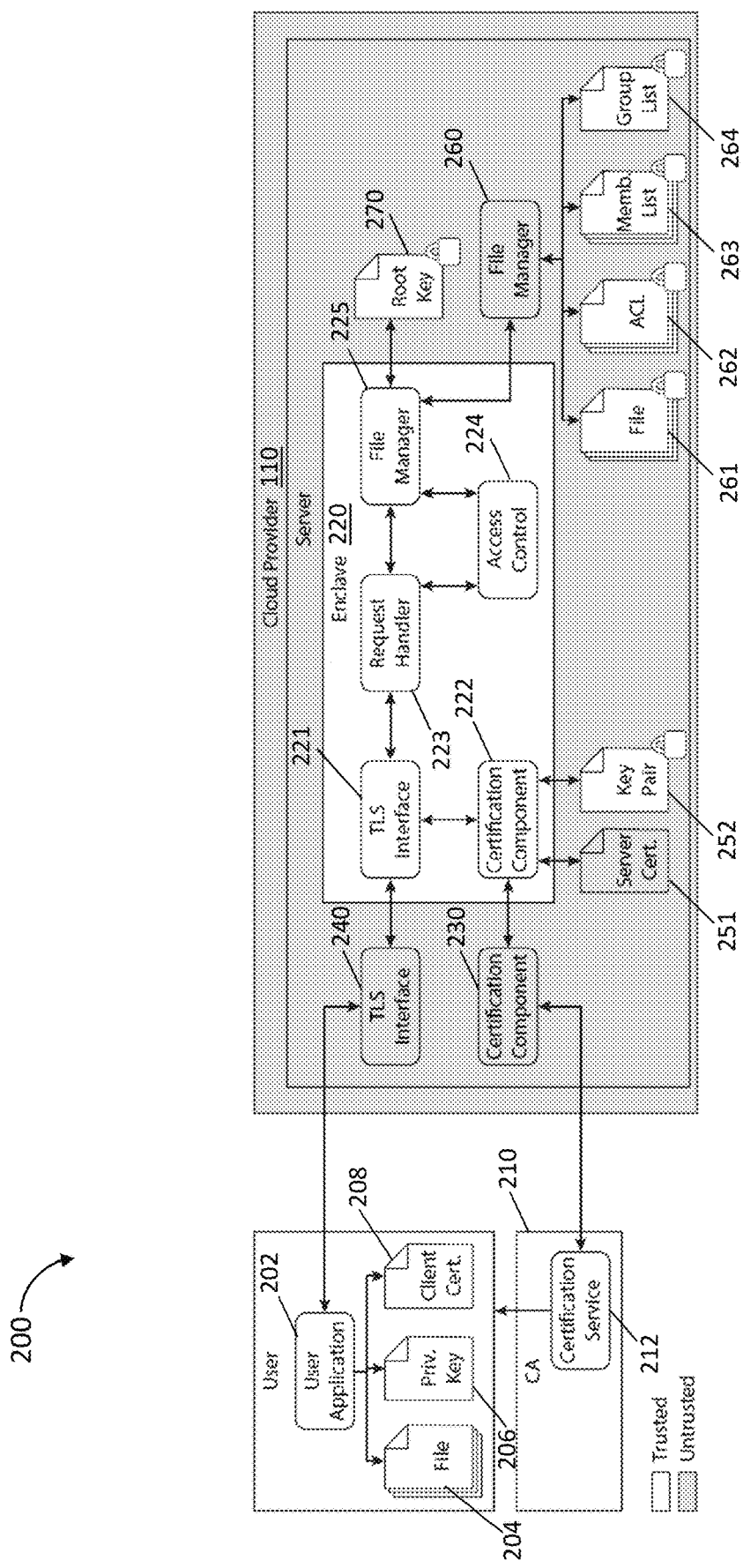
FIG. 2 is a block diagram illustrating additional details of a system architecture in which implementations of the current subject matter may be employed.

FIG. 2 is a block diagram illustrating details of a system architecture 200 in which implementations of the current subject matter may be employed.

With reference to FIG. 2, a setup phase of the architecture 200 may establish bilateral trust between each user u∈U (where each user may access one or more respective devices, e.g., the user equipment 102) and the enclave 220 running at the cloud provider 110. This phase may be executed only once per user, and the established trust may be the basis for the end-to-end security of user files.

Consistent with implementations of the current subject matter, to establish user trust in the enclave 220, a certification service component 212 of a certificate authority (CA) 210 connects to the untrusted certification component 230 to perform remote attestation of the enclave 220. The CA's public key is hard-coded into the enclave 220. Thus, if the CA 210 receives the expected measurement, it is assured to communicate with an enclave that was built specifically for this CA. During remote attestation, the CA 210 establishes a secure channel that ends at the trusted certification component 222. This channel is used for the following message exchanges: (1) the certification service component 212 of the CA 210 requests a certificate signing request (CSR); (2) the trusted certification component 222 of the enclave 220 generates a temporary key pair 252 and provides the certification service component 212 with a CSR containing the public-key of the temporary key pair 252; and (3) the certification service component 212 generates and signs a server certificate 251 and provides it to the enclave's trusted certification component 222. The trusted certification component 222 checks the certificate's validity. On success, it persists the server certificate 251 in untrusted memory, seals the key pair 252, and triggers a trusted TLS interface 221 to update its server certificate. The CA 210 can request a new CSR and subsequently replace the server certificate at any time. Consistent with implementations of the current subject matter, a separation in an untrusted certification component 230 and the trusted certification component 222 may not be necessary if the enclave 220 support direct I/O.

During runtime, according to aspects of the current subject matter, the user (e.g., at the one or more user equipment 102 accessed by the user) receives the server certificate 251 on every connection. As the CA 210 checks the validity of the enclave 220 and the user trusts the CA 210, the user may only have to verify the server certificate 251 with the CA's public key to be sure that communication is with a trusted. Notably, remote attestation is not necessary.

Consistent with implementations of the current subject matter, to establish enclave 220 trust in the user, for each user u∈U, the CA 210 validates the user's identity and provides a client certificate 208 to the user. This certificate contains identity information (e.g., a user ID, a mail address, a full name, and/or other identification information). User u may check that the client certificate 208 is signed by the trusted CA 210 as the user knows CA's public key. During a TLS handshake, user application 202 present the client certificate 208 to the enclave 220, which validates the certificate using the CA's public key. On success, the enclave 220 can be sure that it communicates with a valid user of the system.

With continued reference to FIG. 2, the user application 202 may link the user's local file systems 204 to the remote file system at the cloud provider 110. For this link, a connection is established to a second external interface, an untrusted TLS interface 240. The untrusted TLS interface 240 is used to establish a secure TLS connection directly to the trusted TLS interface 221.

After a TLS handshake, the user application 202 may send requests to the enclave 220. Notably, the user application 202 does not require any special hardware, and it only needs to store a client certificate 208 and corresponding private key 206, independent of cloud stored files, permissions, or group memberships.

Consistent with implementations of the current subject matter, the TLS interface is partitioned into an untrusted part (240, outside the enclave 220) and trusted part (221, inside the enclave 220). Although TLS interfaces are described, implementations of the current subject matter are not so limited and other interfaces may be used. The untrusted TLS interface 240 terminates the network connection (e.g., TCP), because the enclave 220 cannot perform I/O. All TLS records are forwarded to the trusted TLS interface 221, which first performs the TLS handshake using the most recent server certificate 251. Next, it decrypts/encrypts all incoming/outgoing TLS records. As such, the trusted TLS interface 221 is the endpoint of a secure channel from the user application 202 to the enclave 220. Consistent with implementations of the current subject matter, a separation in untrusted TLS interface 240 and trusted TLS interface 221 may not be necessary if the enclave 220 supports direct I/O.

A request handler component 223 may parse each incoming request, check the syntax, use the identity information in the client certificate 208 to allocate the request to a user u, and processes the request as outlined in Algorithm 1 (shown in Table 3 below). During processing, it uses internal operations (shown in Table 4 below), which are provided by an access control component 224 and a file manager component 225.

TABLE 3

Algorithm 1 SeGShare's external requests.

▷ User u wants to create a directory at $path_1$
function put_$f_D$(u, $path_1$);
    $path path_2$ = parent($path_1$)
    if isDir($path_1$) and !exists_f($path_1$) and exists_f($path_2$) then
        if $path_2$ == "/" or auth_f(u, $p_w$, toFile($path_1$)) then
            updateRel($r_{FO}$, $r_{FO}$ ∪ ($g_u$, toFile($path_1$)))
            write($path_1$,"")
            con ← PAE_Bec($SK_{f2}$, read($path_2$))
            write($path_2$, PAE_Enc($SK_{f2}$, IV, con + $path_1$))

▷ User u wants to create or update a file at $path_1$ with content $con_1$
function put_$f_c$(u, $path_2$, $con_1$)
    $path_2$ = parent($path_1$)
    if !isDir($path_1$) and (($path_2$ == "/") or (exists_f($path_2$) and auth_f(u, $p_w$, toFile($path_2$))) or (exists_f($path_1$) and auth_f(u, $p_w$, toFile($path_1$)))) then
        updateRel($r_{FO}$, $r_{FO}$ ∪ ($g_u$, toFile($path_1$)))
        write($path_1$, PAE_Enc($SK_{f1}$, IV, $con_1$))
        $con_2$ ← PAE_Dec($SK_{f2}$, read($path_2$))
        write($path_2$, PAE_Enc($SK_{f2}$, IV, $con_2$ + $path_1$))

▷ User u wants to get file content if toFile(path) = F ∈ $F_C$ and directory listing if toFile(path) = f ∈ $F_D$
function get(u, path)
    if auth_f(u, $p_r$, toFile(path)) then
        return PAE_Dec($SK_f$, read(path))

▷ User u wants to set permission p for group g for file at path
function set_p(u, path, g, p)
    if auth_f(u,"", toFile(path)) then
        updateRel($r_P$, $r_P$ ∪ (p, g, f))

▷ User $u_1$ wants to add user $u_2$ to group g
function add_u($u_1$, $u_2$, g)
    if !exists_g(g) then
        updateRel(G, G ∪ g)
        updateRel($r_G$, $r_G$ ∪ ($u_1$, g))
    if auth_g(rG, g) then
        updateRel(g, g ∪ $u_2$)

▷ User $u_1$ wants to remove user $u_2$ from group g
function rmv_u($u_1$, $u_2$, g)
    if auth_g($u_1$, g) then
        updateRel(g, g,\$u_2$)

TABLE 4

| Operation | Description |
| --- | --- |
| f ← toFile(path) | Get file f corresponding to path path |
| $path_2$ ← parent($path_1$) | For path $path_1$, get parent directory's path $path_2$ |
| write(path, con) | Create or update file at path path with content con |
| con ← read(path) | Read file at path path |
| {0, 1} ← exists_f(path) | Check if file with path path exists, i.e., ∃f ∈ FS: toFile(path) = f |
| {0, 1} ← exists_g(g) | Check if group g exists, i.e., ∃$g_2$ ∈ G: g == $g_2$ |
| {0, 1} ← is Dir(path) | Check if file with path path is a directory i.e., ∃f ∈ $F_D$: toFile(path) == f |
| c ← PAE_Enc(SK, IV, v) | Encrypt value v under the initialization vector IV and key SK with PAE |
| v ← PAE_Dec(SK, c) | Decrypt the ciphertext c under key SK with PAE |
| {0, 1} ← auth_f(u, p, f) | Check if user u has permission p on file f, i.e., ∃g: (u, g) ∈ $r_G$ ∧ ((p, g, f) ∈ $r_P$ ∨ (g, f) ∈ $r_{FO}$) |
| {0, 1} ← auth_g(u, $g_2$) | Check if user u is allowed to change group g2, i.e., ∃$g_1$: (u, $g_1$) ∈ $r_G$ ∧ ($g_1$, $g_2$) ∈ $r_{GO}$ |
| updateRel($r_1$, $r_2$) | Update relation $r_1$ to $r_2$ |

The architecture consistent with implementations of the current subject matter may achieve separation of authentication and authorization by allocating u based on the identity information in the client certificate 208 and using u for authorization decisions. Furthermore, the combination of operations outlined in Algorithm 1 allow a user to share a file or directory with individual users (using their default groups) and groups, dynamically change permissions and group memberships, and set separate read and write permissions. Moreover, none of the operations require any interaction with other users. Updates of file and group ownerships allow the setting of multiple owners.

The access control component 224 is responsible for relation updates (e.g., internal operation updateRel) and access control checks (e.g., internal operations auth_f and auth_g). For both tasks, the access control component 224 may use the file manager component 225 to read and write the required relations.

Trusted and untrusted file manager components handle all files stored in untrusted memory. The trusted file manager component 225 encrypts/decrypts the content of all files that should be written/read with, for example, PAE_Enc/PAE_Dec using a unique file key $SK_f$ per file. The file key may be derived from a root key $SK_r$ (e.g., root key 270), which the trusted file manager 225 generates and seals on the first enclave start and unseals on subsequent enclave starts. All encrypted data is passed/received to/from the untrusted file manager component 260, which handles the actual memory access (e.g., internal operations read and write).

The file manager may handle the following file types, for example. Each f∈FS is stored as a regular file (e.g., files 261). For each f∈FS, an ACL file is stored under f's path appended with a suffix (e.g., ACL 262). This ACL stores f's access permissions ($r_P$) and file owners ($r_{FO}$). One group list file stores all present groups (G) (e.g., group list 264). For each user u∈U, a member list file stores u's group memberships ($r_G$) (e.g., member list 263) and also keeps track of u's group ownerships ($r_{GO}$). Consistent with implementations of the current subject matter, the first two types may be stored in the so-called content store, the latter two in the so-called group store. The files in the content store are stored in dictionaries according to the structure given by their paths. A root directory file stores a list of first level children. The files in the group store are stored flat and a root directory file stores a list of all contained files. This separation in two stores adds an extra layer of security and improves the performance as file, directory, and permission operations are independent of group operations.

The content of ACL 262, member lists 263, and the group list 264 may be kept sorted. Thus, a permission update may only require one decryption of the corresponding ACL, a logarithmic search, one insert or update operation, and one encryption of the ACL. Membership updates require the same operations on one member list file and (in some cases) on the group list file. Thus, permission and membership revocations do not require re-encryptions of content and directory files, and they are performed immediately. Each f∈FS is stored in one encrypted file and f is accompanied by one encrypted ACL file. Thus, the number of ciphertexts is constant for each content and directory file. The same encrypted content or directory file can be accessed by different groups. The confidentiality and integrity of content files, permissions, existing groups, and group memberships are protected by encrypting the corresponding files with, for example, PAE.

Data deduplication may be used to save storage cost by only storing a single copy of redundant objects, which can be, for example, files or blocks. Block based deduplication may be further divided in fixed-size or variable-size block deduplication. Deduplication may be done client-side (e.g., users ask the server if a file is already present and only upload the whole file if necessary) or server-side (e.g., users upload and the server performs deduplication). The architecture consistent with implementations of the current subject matter may be compatible with deduplication alternatives. For example, a file and server based deduplication may not require additional client-side processing, may prevent client-side attacks, and may have small leakage on the server-side approaches.

Data deduplication may be enabled in the architecture consistent with implementations of the current subject matter by introducing a third store, denoted as a deduplication store, and modifying the trusted file manager. For each uploaded content file, the trusted file manager may performs the following steps: temporarily store the file in the deduplication store under a unique random name; calculate an HMAC over the file's content using the root key $SK_r$; convert the HMAC to a hex string hName; if no file with the name hName is present in the deduplication store, rename the temporary file to hName; otherwise, remove the temporary file; add a content file to the content store with the modification that the content file is not filled with the actual file content but with hName; for each request to a content file, the trusted file manager accesses the file in the content store and follows the indirection to the file in the deduplication store. The data deduplication process consistent with implementations of the current subject matter performs deduplication of plaintext data and encrypts a single copy. This is possible because the enclave has access to the file keys, which is not the case at other server-side deduplication schemes.

Permissions for any file f∈FS may be inherited from a parent directory according to aspects of the current subject matter. The user application and request handler may be extended with a new request to add/remove f to/from the inherit relation ($r_I$). The access control component may allow the file owner to execute such requests, and the trusted file manager may add/remove an inherit flag to/from f's ACL file. If the inherit flag is not set in f's ACL file, access control checks for f may be performed by auth_f as defined in Table 4. Otherwise, a permission $p_I$ defined for a group g on f may have precedence over a permission P2 defined for g on f's parent. In other words, if fp is f's parent and the inherit flag is set, auth_f uses the following predicate: ∃g: (u, g)∈rG∧((p, g, f)∈rp∨((p, g, f)∈rp∧(p, g, fp)∈r p)∨(g, f)∈r FO).

Aspects of the current subject matter may be used to protect the confidentiality of the file system structure (S1) by hiding all filenames and the directory structure. A change of the trusted file manager may be sufficient: before passing a path to the untrusted file manager, it calculates the path's HMAC using SKR and converts the HMAC to its hexadecimal representation. As a result, all files may be stored in a flat directory structure at a pseudorandom location. The architecture consistent with implementations of the current subject matter stores the original path in the directory files. Therefore, consistent with implementations of the current subject matter, directory listing is still possible.

The trusted file manager, consistent with implementations of the current subject matter, may encrypt the content of all files with PAE, and thus guarantees confidentiality and integrity on each file individually. However, an attacker may perform a rollback attack on each encrypted file (e.g., the attacker uses an outdated version of an encrypted file to replace the current version). Not preventing such a rollback can have severe consequences (e.g., an old member list could enable a user to regain access to files for which the permissions were previously revoked). According to aspects of the current subject matter, a Merkle hash tree variant may be used to prevent rollbacks of individual files and to protect the integrity of the file system structure. Files in the content store, as well as the group store and deduplication store may be protected. Each content file, ACL, and empty directory file is represented by a leaf node of the Merkle tree, and each other directory file is represented by an inner node. Each leaf node stores a hash that is a combination of hashes over the file path and the file content. Each inner node stores a hash that is a combination of the hash of all children (e.g., content files, ACLs, and directory files), a hash over the directory path and a hash over the directory content (children list). Before encryption, the trusted file manager may prepend the content of content files, ACLs, and directory files with the combined hashes, and after decryption reads the hashes from there. As each file stores its own hash, each file representing a leaf node, inner node, sibling node, and child node may be denoted as a leaf file, inner file, sibling file, and child file respectively. The tree's root hash may be stored in the root directory file (e.g., the root file). Typically, on a leaf file update or addition, its hash and all hashes on the path to the root file need to be updated, which requires accessing all sibling files to combine their hashes. Moreover, on a leaf file read, a validation is performed starting from this file to the root file always accessing all sibling files.

According to aspects of the current subject matter, all individual hashes and the combination of hashes may be replaced by multiset hashes. This allows the calculation of a one-way hash of an individual value; combines multiple hashes to a fixed-size bit string, independent of the order of hashes; adds/removes elements incrementally and efficiently; and checks the equality of two multiset hashes efficiently. Leaf file updates or additions are improved, because it allows updates of the hash of each inner file by subtracting the hash of the no longer valid child file and adding to the new hash without accessing any sibling file. Second, depending on the number of child files, each inner file stores multiple bucket hashes and one main hash. The bucket hashes store a combination of child files' main hashes, whereby a hash over the child files' path determines the used bucket, and the main hash stores a combination of the hashed file path, the hashed file content, and its bucket hashes. According to aspects of the current subject matter, two hashes are updated for every level of the tree. For leaf file validation, it is sufficient to recalculate and compare a single bucket hash per tree level, which only requires an access to all files in the same bucket.

Aspects of the current subject matter, based on the trusted execution environment, may be used to mitigate rollback of the whole file system by protecting the root hash against rollbacks as it represents a state of the complete file system. First, if the trusted execution environment offers a protected memory that can only be accessed by a specific enclave and is persisted across restarts, it is sufficient to write/read the root hash into/from this memory, instead of storing it in the root file. Second, if the trusted execution environment offers a monotonic counter that can only be accessed by a specific enclave and is persisted across restarts, the following may be implemented. On each file update, the trusted file manager increments the monotonic counter of the trusted execution environment and writes the new counter value into the root file before encryption. On validity check of the root hash, monotonic counter is compared with the counter value stored in the root file. The group store's and deduplication store's root hash may be protected by the same mechanism to protect the rollback of all permissions and deduplicated files, respectively.

The architecture consistent with implementations of the current subject matter may be deployed on multiple application servers if many users want to use the file sharing service. Assuming that all enclaves access the data from one central data repository, two changes may be implemented: (1) the untrusted file manager may be extended to access data from the central data repository, and (2) enclaves may access the same root key $SK_r$. In the following, enclaves that already have $SK_r$ are denoted as root enclaves and the others as non-root enclaves. The CA may task one enclave with the generation of $SK_r$ during the provisioning of the server certificate. The CA provides all other enclaves with addresses of root enclaves during the same process. Each non-root enclave randomly selects one root enclave and performs remote attestation with it. If the measurements of both enclaves are equal, the non-root enclave is assured to communicate with another enclave that was compiled for the same CA, as the CA's public key is hard-coded. During remote attestation, a secure channel may be established and the root enclave may transfer $SK_r$ over it.

Replication of the architecture may also useful for file system owners, which might be afraid to lose access to their files, because $SK_r$ is only accessible by a single enclave. With the proposed method, $SK_r$ may be contained inside trusted enclaves at all time, but still usable on multiple replicas. To combine the whole file system rollback protection and the architecture replication, it may be necessary to use a non-local protected memory or monotonic counter for each store.

Aspects of the current subject matter may support file system backups: the cloud provider only has to copy the files on disk. Backup restoration depends on the enclave that handles the restored data. If the enclave is the same that wrote the files in the first place, it poses the required decryption key. Otherwise, the architecture replication process described herein may be used. Restoration becomes more complicated if the whole file system rollback protection is active, because it might be necessary to restore an old state. The CA may send a signed reset message to the enclave for this case. The enclave checks the validity of the message's signature, reads the stored hashes from the root files of the various stores, recalculates the root hashes, and compares the hashes. Assuming a successful check and the monotonic counter based rollback solution, the enclave overwrites the stored monotonic counter with the current monotonic counter of the trusted execution environment.

Figure 3:
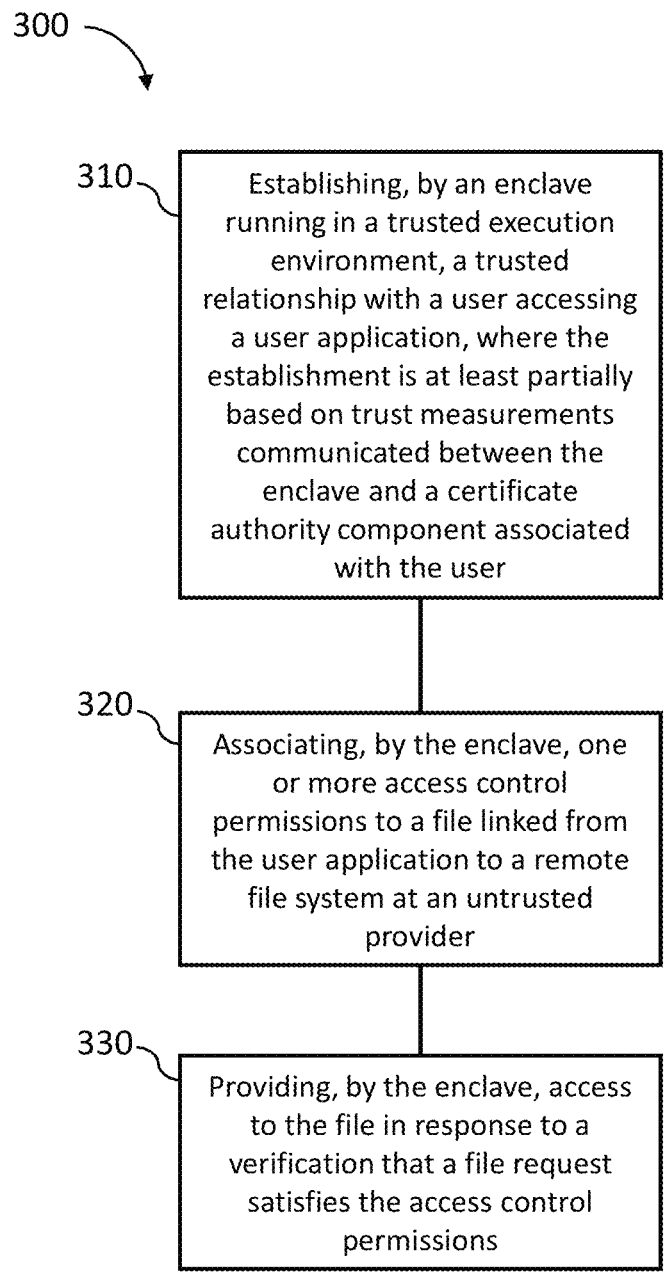
FIG. 3 depicts a flowchart illustrating a process consistent with implementations of the current subject matter.

FIG. 3 depicts a flowchart 300 illustrating a process consistent with implementations of the current subject matter.

At 310, an enclave 220 that is executed by a trusted execution environment at an untrusted provider (e.g., the cloud provider 110) may establish a trusted relationship with a user accessing a user application. The establishment may be at least partially based on trust measurements communicated between the enclave 220 and a certificate authority component 210 associated with the user. For example and according to aspects of the current subject matter, establishing the trusted relationship between the user and the enclave 220 may include the trusted certification component 222 generating a temporary trust information (e.g., a key pair 252). The temporary trust information may include, for example a public key and a private key.

According to aspects of the current subject matter, establishing the trusted relationship between the user and the enclave 220 may further include the trusted certification component 222 providing, to the CA's certificate service 212, a server token request (e.g., a server certificate request). The server token request may contain a public key.

According to aspects of the current subject matter, establishing the trusted relationship between the user and the enclave 220 may further include the CA's certificate service 212 providing, to the to the trusted certification component 222, a signed server token (e.g. a signed server certificate). The signed server token may be signed by the CA with the CA's public key.

According to aspects of the current subject matter, establishing the trusted relationship between the user and the enclave 220 may further include the trusted certification component 222 verifying a received signed server token (e.g., a server certificate) with the CA's trust information (e.g., the CA's public key), which may be coded (e.g., hard-coded) into the enclave 220. Upon verification of the validity of the signed server token, the signed server token may be persisted to memory.

According to aspects of the current subject matter, establishing the trusted relationship between the user and the enclave 220 may further include the user application 202 receiving the signed server certificate upon connection with the enclave 220. The user application 202 may verify the certificate with the CA's trust information (e.g., public key) known to it.

According to aspects of the current subject matter, establishing the trusted relationship between the enclave 220 and the user may further include the user application 202 sending an authentication token (e.g. a client certificate) to the enclave 220. The enclave 220 may check the validity of the authentication token with coded (e.g., hardcoded) CA trust information (e.g., the CA's public key).

With continued reference to FIG. 3, at 320, the enclave 220 associates one or more access control permissions to a file linked from the user application 202 to a remote file system at the untrusted provider (e.g., the cloud provider 110). The one or more access control permissions may define one or more parameters of access related to the file (e.g., as established by the user and as provided to the enclave 220). The one or more access control permissions may be defined by the user for individual users and/or groups of users. For example, as described herein, the combination of operations outlined in Algorithm 1 allow a user to share a file or directory with individual users (using their default groups) and groups, dynamically change permissions and group memberships, and set separate read and write permissions. According to aspects of the current subject matter and with reference to FIG. 2, the access control component 224 is responsible for relation updates (e.g., internal operation updateRel) and access control checks (e.g., internal operations auth_f and auth_g). For both tasks, the access control component 224 may use the file manager component 225 to read and write the required relations.

According to aspects of the current subject matter, the file is linked to the remote file system over a secure interface between the user application 202 and the enclave 220. For example, the user application 202 may link the user's local file systems 204 to the remote file system at the cloud provider 110. For this link, a connection is established to a second external interface, an untrusted TLS interface 240. The untrusted TLS interface 240 is used to establish a secure TLS connection directly to the trusted TLS interface 221.

At 330 of the flowchart 300, the enclave 220 provides access to the file. According to aspects of the current subject matter, the provision of access to the file may be in response to a verification by the enclave 220 that a request for the file satisfies the one or more access control permissions (e.g., that a user has individual access rights or is part of a group with access rights based on the permissions established by the file owner). According to aspects of the current subject matter, the provision of access to the file may be further in response to establishment of a second trusted relationship between a second user (having individual access rights or being part of a group with access rights) and the enclave 220.

Consistent with implementations of the current subject matter, the enclave 220 receives the file in an encrypted form from the remote file system and decrypts the encrypted file. According to aspects of the current subject matter, trusted and untrusted file manager components handle all files stored in untrusted memory. The trusted file manager component 225 encrypts/decrypts the content of all files that should be written/read with, for example, PAE_Enc/PAE_Dec using a unique file key $SK_f$ per file. The file key may be derived from a root key $SK_r$ (e.g., root key 270), which the trusted file manager 225 generates and seals on the first enclave start and unseals on subsequent enclave starts. All encrypted data is passed/received to/from the untrusted file manager component 260, which handles the actual memory access (e.g., internal operations read and write).

For example, the enclave 220 may transfer and/or receive encrypted data through an untrusted file manager component 260 that is outside of the enclave 220 transferring data to a trusted file manager component 225. A separation of trusted and untrusted file manager may not necessary if the trusted execution environment supports enclaves performing direct I/O. Consistent with implementations of the current subject matter, the data may be encrypted with a file key. The file key may be, for example, the file key unique to a particular file and derived from a root key generated by the enclave 220. According to aspects of the current subject matter, the encryption occurs within the enclave 220. The encrypted data may be decrypted in the enclave 220 and sent to the user over the channel including the secure interface.

The architecture according to aspects of the current subject matter provides an end-to-end encrypted, group file sharing solution supporting large and dynamic groups using trusted execution environments (TEE). The architecture protects the confidentiality and integrity of content files, the file system structure, permissions, existing groups, and group memberships. The architecture may enforce immediate permission and membership revocations; support deduplication; mitigate rollback attacks; and provide separation of authentication and authorization. According to aspects of the current subject matter, it may take under 2.4 seconds to upload and download a 200 MB plaintext file. Permissions and memberships updates may require under 170 milliseconds, independent of the number of stored files, file sizes, number of group members, number of user permissions, and groups sharing a file. Furthermore, a 200 MB plaintext file may require, for example, about 202.13 MB encrypted storage, even if it is shared with more than 1000 groups.

Figure 4:
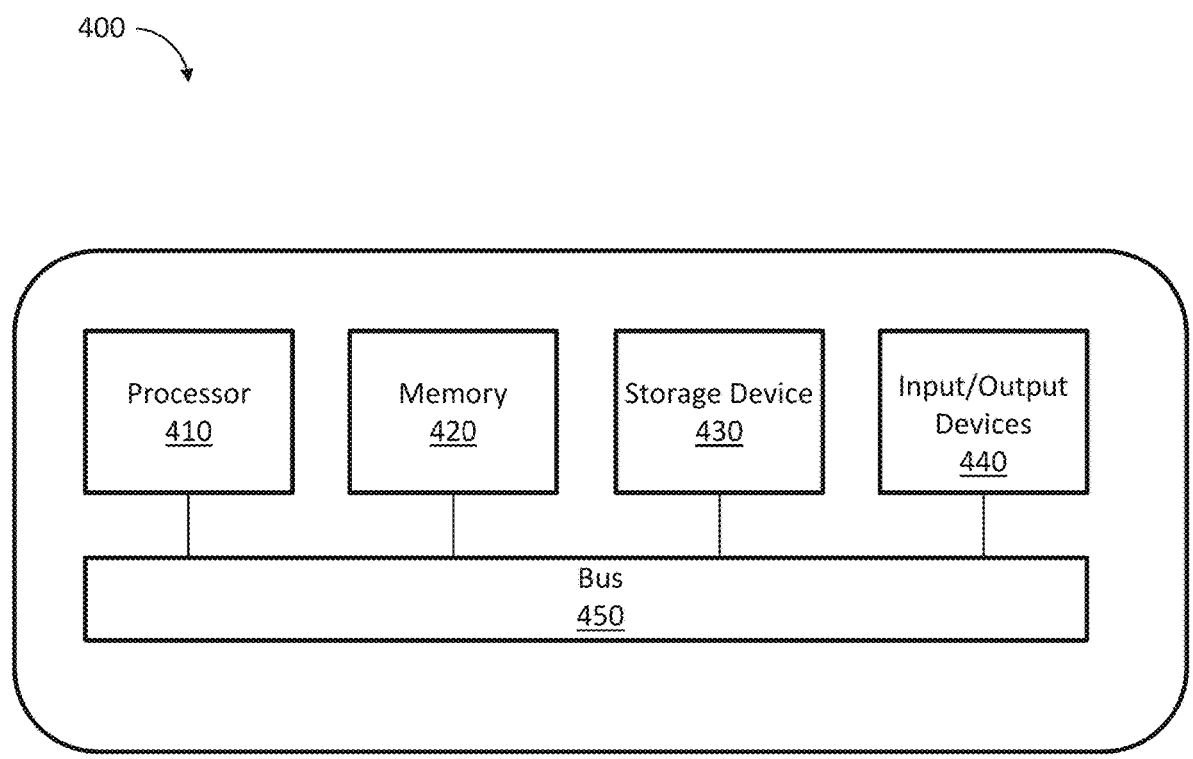
FIG. 4 depicts a block diagram illustrating a computing system consistent with implementations of the current subject matter.

FIG. 4 depicts a block diagram illustrating a computing system 400 consistent with implementations of the current subject matter. Referring to FIG. 1 and FIG. 2, the computing system 400 can be used to implement the system 100, the system 200, and/or any components therein.

As shown in FIG. 4, the computing system 400 can include a processor 410, a memory 420, a storage device 430, and input/output devices 440. According to implementations of the current subject matter, a trusted execution environment may be a secure area that may be contained in the processor 410, or it may be an additional hardware and/or software component. The trusted execution environment may run enclaves to guarantee confidentiality and integrity protection to code and data contained therein, even in an untrusted environment.

The processor 410, the memory 420, the storage device 430, and the input/output devices 440 can be interconnected via a system bus 450. The processor 410 is capable of processing instructions for execution within the computing system 400. Such executed instructions can implement one or more components of, for example, the system 100 and/or the system 200. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a floppy disk device, a hard disk device, an optical disk device, or a tape device, or other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/ output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions which, when executed by the at least one data processor, result in operations comprising:
   establishing, by an enclave executed by a trusted execution environment that runs at an untrusted provider, a trusted relationship with a user accessing a user application, wherein the establishment is at least partially based on a trust measurement communicated between the enclave and a certificate authority component associated with the user;
   associating, by the enclave, one or more access control permissions to a file linked from the user application to a remote file system at the untrusted provider, wherein to link the file to the remote file system, the user application establishes a network connection to an untrusted transport layer security interface at the untrusted provider that runs the trusted execution environment, wherein the untrusted transport layer security interface terminates the network connection with the user application and establishes a secure transport layer security connection to a trusted transport layer security interface within the enclave, the trusted transport layer security interface decrypting or encrypting incoming or outgoing transport layer security data and providing a secure transport layer security connection to the user application, wherein the one or more access control permissions define one or more parameters of access related to the file and defined by the user for individual users and/or groups of users; and providing, by the enclave, access to the file, wherein the providing is in response to a verification that a request for the file satisfies the one or more access control permissions, and wherein to provide access to the file, the operations further comprise:

receiving, by a trusted file manager at the enclave, the file in an encrypted form from the remote file system at the untrusted provider, wherein the file is encrypted with a file key, the file key unique to the file and derived from a root key generated by the enclave;

decrypting, by the trusted file manager at the enclave, the encrypted file; and sending, by the enclave, the file over the secure transport layer security connection channel to provide the file.

2. The system of claim 1, wherein establishing the trusted relationship comprises:

providing, by the enclave and to the certificate authority component, a server token request comprising a public key;

receiving, by the enclave and from the certificate authority component, a server token signed with a certificate authority public key; and verifying, by the enclave, the received server token, wherein the verification is based upon the certificate authority public key.

3. The system of claim 2, wherein the certificate authority public key is hard-coded into the enclave, and wherein the server token is persisted to memory of the enclave upon verification of the received server token.

4. The system of claim 2, wherein establishing the trusted relationship further comprises:

receiving, by the enclave and from the user application, an authentication token; and verifying, by the enclave, the authentication token based upon the certificate authority public key.

5. The system of claim 1, wherein the one or more parameters of access related to the file comprise a level of permission for the individual users and/or the groups of users.

6. The system of claim 1, wherein the encryption of the file with the file key occurs within the enclave.

7. The system of claim 1, wherein providing, by the enclave, access to the file is further in response to establishment of a second trusted relationship with a second user having individual access rights or being part of a group with access rights.

8. A method, comprising:

establishing, by an enclave executed by a trusted execution environment that runs at an untrusted provider, a trusted relationship with a user accessing a user application, wherein the establishment is at least partially based on a trust measurement communicated between the enclave and a certificate authority component associated with the user;

associating, by the enclave, one or more access control permissions to a file linked from the user application to a remote file system at the untrusted provider, wherein to link the file to the remote file system, the user application establishes a network connection to an untrusted transport layer security interface at the untrusted provider that runs the trusted execution environment, wherein the untrusted transport layer security interface terminates the network connection with the user application and establishes a secure transport layer security connection to a trusted transport layer security interface within the enclave, the trusted transport layer security interface decrypting or encrypting incoming or outgoing transport layer security data and providing a secure transport layer security connection to the user application, wherein the one or more access control permissions define one or more parameters of access related to the file and defined by the user for individual users and/or groups of users; and providing, by the enclave, access to the file, wherein the providing is in response to a verification that a request for the file satisfies the one or more access control permissions, and wherein to provide access to the file, the method further comprises:

receiving, by a trusted file manager at the enclave, the file in an encrypted form from the remote file system at the untrusted provider, wherein the file is encrypted with a file key, the file key unique to the file and derived from a root key generated by the enclave;

decrypting, by the trusted file manager at the enclave, the encrypted file; and sending, by the enclave, the file over the secure transport layer security connection channel to provide the file.

9. The method of claim 8, wherein establishing the trusted relationship comprises:

providing, by the enclave and to the certificate authority component, a server token request comprising a public key;

receiving, by the enclave and from the certificate authority component, a server token signed with a certificate authority public key; and verifying, by the enclave, the received server token, wherein the verification is based upon the certificate authority public key.

10. The method of claim 9, wherein the certificate authority public key is hard-coded into the enclave, and wherein the server token is persisted to memory of the enclave upon verification of the received server token.

11. The method of claim 9, wherein establishing the trusted relationship further comprises:

receiving, by the enclave and from the user application, an authentication token; and verifying, by the enclave, the authentication token based upon the certificate authority public key.

12. The method of claim 8, wherein the one or more parameters of access related to the file comprise a level of permission for the individual users and/or the groups of users.

13. The method of claim 8, wherein the encryption of the file with the file key occurs within the enclave.

14. The method of claim 8, wherein providing, by the enclave, access to the file is further in response to establishment of a second trusted relationship with a second user having individual access rights or being part of a group with access rights.

* * * * *